UNITED STATES PATENT OFFICE 2,560,666

PROCESS FOR PRODUCING 4-TERTIARY-BUTYL-3-METHYLPHENOL

Donald R. Stevens, Wilkinsburg, and Robert S. Bowman, Pittsburgh, Pa., assignors to Gulf Research & Development Company, Pittsburgh, Pa., a corporation of Delaware No Drawing. Application April 16, 1948, Serial No. 21,568

3 Claims. (Cl. 260—624)

This invention relates to mono-alkylated mono-hydroxy phenols, and more particularly it relates to 4-tertiary-butyl-3-methylphenol and to a process of producing this compound, all as more fully hereinafter set forth and as claimed.

It is an object achieved by this invention to provide a process for producing 4-tertiary-butyl-3-methylphenol.

This and other objects achieved by this invention will become apparent in the following detailed description thereof.

In accordance with our invention, we produce the compound 4-tertiary-butyl-3-methylphenol by treating metacresol with isobutylene at a low alkylation temperature in the presence of a trace of an acid alkylating catalyst such as sulfuric acid. Even under the mild alkylating conditions which we employ in the preparation of 4-tertiary-butyl-3-methylphenol from metacresol and isobutylene, there also is formed some 6-tertiary-butyl-3-methylphenol and 3-methyl-4,6-di-tertiary-butylphenol. These compounds, however, are easily separated from the desired 4-tertiary-butyl-3-methylphenol and from any unreacted metacresol because of the difference in their chemical and physical properties. Some of the characteristics which make their separation easy are as follows:

| | Soluble in 10% NaOH | Melting Point, °C. | Boiling Point, °C./20 mm. |
|---|---|---|---|
| metacresol | Yes | 11.5 | 100 |
| 4-t-butyl-3-methylphenol | Yes | 72–73 | 152–153 |
| 6-t-butyl-3-methylphenol | No | 21.3 | 129 |
| 3-methyl-4,6-di-t-butylphenol | No | 62.1 | 167 |

We have discovered that 4-tertiary-butyl-3-methylphenol is soluble in oil and dilute aqueous alkali solution and insoluble in water. We have also discovered that this compound possesses antioxidant properties and when added to organic materials, especially petroleum products such as motor fuels, lubricating oils and greases, insulating oils, turbine oils, solvents, waxes and the like, in relatively small amounts, it stabilizes such materials against oxidational changes. The compound produced by the present invention is also adapted to be employed as a chemical intermediate in the manufacture of pharmaceuticals. A specific example of one of the pharmaceuticals which may be synthesized from the compound of our invention is thymol. Thymol per se is a useful antiseptic. It also is commonly reduced by hydrogenation to form menthol.

The catalysts which may be used in accordance with our invention may be any of the usual acid-acting condensing agents, including sulfuric acid, phosphoric acid, anhydrous aluminum chloride, boron tri-fluoride complexes, ferric chloride, hydrogen chloride and the like. Sulfuric acid is ordinarily most satisfactory by reason of its efficiency and cheapness. The amount of acid condensing agent required is relatively small with respect to the amount of metacresol; in some instances the amount of acid condensing agent required is as little as 0.001 per cent of the metacresol or less. When commercial concentrated sulfuric acid is used, amounts corresponding to between about 0.001 and 0.1 per cent of the weight of the metacresol have produced satisfactory yields. More than 0.1 per cent of sulfuric acid, based on the amount of metacresol, is not ordinarily desirable because larger amounts of the condensing agent favor the formation of 6-tertiary-butyl-3-methylphenol. While 6-tertiary-butyl-3-methylphenol serves as an intermediate in the manufacture of other organic chemicals and also possesses the property of inhibiting oxidational changes in petroleum products, it, in contrast to 4-tertiary-butyl-3-methylphenol, cannot be used in the synthesis of certain pharmaceuticals, such for example, as thymol. Sulfuric acid may be used with or without the addition of a mitigating agent, such as boric acid or an alkali sulfate, adapted to lessen the polymerizing effect of the sulfuric acid on the isobutylene. When a mitigating agent is used, for example boric acid, a solution of 5.0 per cent by weight of boric acid in commercial concentrated sulfuric acid may be used in amounts corresponding to between about 0.001 and 0.1 per cent of the weight of the metacresol.

In accordance with our invention, the catalyst is customarily first mixed with the metacresol and isobutylene is passed into the mixture thus formed. Isobutylene is added to the mixture until an amount has been absorbed corresponding to not more than 1.5 moles of isobutylene per mole of metacresol. In general the molecular ratio of isobutylene to metacresol may be between about 0.4:1 and 1.5:1. We prefer to employ an isobutylene to metacresol molecular ratio of about 0.8:1. While this ratio is insufficient to completely mono-butylate all of the metacresol, it is also insufficient to form any substantial amount of di-butyl-metacresol. While the molecular ratio of isobutylene to metacresol may be higher than 1.5:1, at ratios above about 1.5:1 additional di-butylation occurs with a resultant decrease in the yield of the desired mono-butylated product. The isobutylene employed in alkylating the metacresol may be used either alone or in admixture with other hydrocarbons. For example, a refinery gas rich in isobutylene has proven satisfactory for the butylation of metacresol.

The reaction is advantageously carried out at a low alkylation temperature, that is, at a temperature between about 0° and about 40° C. If temperatures in excess of about 40° C. are used, the production of 6-tertiary-butyl-3-methylphenol is favored.

The alkylation reaction involves no special difficulties, the reacting ingredients being simply contacted in the usual manner either continuously or in batch operation. After completion of the reaction, the reaction products may be contacted with an aqueous solution of caustic soda or other equivalent alkali, the strength of the contacting solution being preferably not over 15 per cent. This contacting operation neutralizes the acid condensing agent and selectively extracts the alkali-soluble material, that is, unreacted metacresol and 4-tertiary-butyl-3-methylphenol from the alkali-insoluble material, such as 6-tertiary-butyl-3-methylphenol and 3 - methyl-4,6-di-tertiary-butylphenol. The raffinate, or the alkali-insoluble material, may be subjected to dealkylation to produce metacresol and isobutylene. The metacresol and isobutylene thus obtained may be recycled to the alkylation step for further production of the desired 4-tertiary-butyl-3-methylphenol. The alkali extract is treated with HCl until liberation of the phenolic material appears to be complete. The phenolic material, appearing as an oil layer, is then separated from the water layer and treated with a saturated solution of sodium bicarbonate to neutralize any strong acid, such as sulfuric acid, which may be present. The neutralized oil layer may then be washed with water, dried, and subjected to fractionation, preferably under vacuum. The 4-tertiary-butyl - 3 - methylphenol which is obtained upon fractionation of the neutralized oil layer may be purified by recrystallization from a suitable solvent.

In using the terms "dealkylation" and "dealkylating" herein and in the appended claims, we are referring to a splitting off of the tertiary butyl group or groups added during the original alkylation or condensation of metacresol with isobutylene. Dealkylation in the contemplated manner does not split off the methyl group present in the original metacresol. Various dealkylating catalysts may be used including sulfuric acid with or without a mitigating agent such as boric acid, the alkyl esters of sulfuric acid such as diethyl sulfate, the sulfonic acids such as benzene sulfonic acid, aluminum chloride, tetraphosphoric acid, and the like. Various specific methods of effecting dealkylation are disclosed in U. S. Patent No. 2,297,588 to Stevens and Livingstone. Dealkylation may be effected by other known means and it should be understood that we are not limiting the present invention to any particular method of effecting dealkylation.

The following specific example will illustrate one method of producing the 4-tertiary-butyl-3-methylphenol in accordance with our invention.

Five moles (540 gms.) of redistilled metacresol and 0.1 per cent based on the weight of metacresol of concentrated sulfuric acid were introduced into a suitable reaction vessel provided with a gas inlet and a gas outlet and suitable agitating means. Isobutylene was bubbled at the rate of 0.8 liter/minute through the metacresol-sulfuric acid mixture which was maintained at a temperature of about 25° to 30° C. by means of a water bath. After 1.5 hours, 2.25 moles (126 gms.) of isobutylene had been absorbed as determined by an increase in weight of the contents in the reaction vessel. The flow of gas was then stopped and the reaction mass was repeatedly extracted with 100 ml. increments of 10 per cent sodium hydroxide until 1500 ml. of 10 per cent sodium hydroxide had been used. The alkali extract thus obtained containing unreacted metacresol and 4-tertiary-butyl-3-methylphenol was then acidified with concentrated hydrochloric acid whereupon an oil layer was liberated. The oil layer was then separated and shaken with 100 ml. of a saturated solution of sodium bicarbonate to neutralize any sulfuric acid which may have been present. The oil layer was then washed with water and dried. Upon distillation through a 15-plate fractionating column unreacted metacresol was first obtained, and then a fraction boiling at 149° to 153° C./20 mm. was taken overhead. When the latter fraction was seeded with some previously prepared 4 - tertiary - butyl - 3 - methylphenol, a white crystalline mass was obtained. Recrystallization of this material from petroleum ether gave a white crystalline product having the following properties:

|  | Found for Product | Theoretical Data for 4-t-butyl-3-methylphenol |
|---|---|---|
| Melting Point, °C | 72–73 |  |
| Ultimate Analysis, per cent by weight: |  |  |
| Carbon | 80.93 | 80.49 |
| Hydrogen | 9.96 | 9.76 |
| Boiling Point, °C., at 20 mm | 150–152 |  |
| Molecular Weight | 164.7 | 164.0 |

The substantially pure 4-tertiary-butyl-3-methylphenol product thus obtained is insoluble in water, and is soluble in various organic solvents, such as alcohol, benzene, ether, cracked gasoline and other petroleum products.

The following specific example will illustrate the usefulness of our 4-tertiary-butyl-3-methylphenol product in inhibiting the oxidation of a cracked gasoline.

When 4-tertiary-butyl-3-methylphenol, prepared as above-described, was added to a cracked gasoline in the proportion of 0.0002 mole per 100 ml. of gasoline (0.0238 gram per 100 ml.), the oxygen stability induction period of the gasoline, as determined by the A. S. T. M. Standard test D525–46 (Committee D-2), was increased from 114 minutes to 168 minutes.

While this invention has been described with reference to specific details and examples of the production and properties of the compound of our invention, it is to be understood that the invention is not intended to be limited to such details and examples, except as recited hereinafter in the appended claims.

We claim:

1. A process for producing 4-tertiary-butyl-3-methylphenol which consists of mixing metacresol with about 0.001 to about 0.1 per cent by weight of concentrated sulfuric acid, introducing isobutylene into the metacresol-sulfuric acid mixture at an alkylating temperature between about 0° and about 40° C. until said mixture has absorbed isobutylene in an amount corresponding to not more than 1.5 moles of isobutylene per mole of metacresol, contacting the reaction mass thus formed with an aqueous alkali solution of not over 15 per cent strength, recovering an extract portion and a raffinate portion, acidifying the extract portion whereupon an oil layer and an aqueous layer are formed, separating the oil layer from the aqueous layer, neutralizing the oil layer, and fractionating the neutralized oil layer to separately recover metacresol and 4-tertiary-butyl-3-methylphenol.

2. A process for producing 4-tertiary-butyl-3-methylphenol which consists of mixing metacresol with about 0.001 to about 0.1 per cent by weight of concentrated sulfuric acid, introducing isobutylene into the metacresol-sulfuric acid mixture at an alkylating temperature between about 0° and about 40° C. until the molecular ratio of isobutylene to metacresol in the resulting reaction mass is between about 0.4:1 and 1.5:1, contacting said reaction mass with an aqueous solution of caustic soda of not over 15 per cent strength, recovering an extract portion and a raffinate portion, acidifying the extract portion whereupon an oil layer and an aqueous layer are formed, separating the oil layer from the aqueous layer, neutralizing the oil layer, and fractionating the neutralized oil layer to separately recover metacresol and 4-tertiary-butyl-3-methylphenol.

3. A continuous process for producing 4-tertiary-butyl-3-methylphenol which consists of mixing metacresol with about 0.001 to about 0.1 per cent by weight of concentrated sulfuric acid, introducing isobutylene into the metacresol-sulfuric acid mixture at an alkylating temperature between about 0° and about 40° C. until the molecular ratio of isobutylene to metacresol in the resulting reaction mass is between about 0.4:1 and 1.5:1, contacting said reaction mass with an aqueous 10 per cent sodium hydroxide solution, recovering an extract portion and a raffinate portion, acidifying the extract portion whereupon an oil layer and an aqueous layer are formed, separating the oil layer from the aqueous layer, neutralizing the oil layer, fractionating the neutralized oil layer to separately recover metacresol and 4-tertiary-butyl-3-methylphenol, dealkylating said raffinate portion to liberate metacresol and isobutylene, and recycling said unreacted metacresol together with the liberated metacresol and isobutylene to the beginning of said continuous process.

DONALD R. STEVENS.
ROBERT S. BOWMAN.

REFERENCES CITED

The following references are of record in the file of this patent:

UNITED STATES PATENTS

| Number | Name | Date |
|---|---|---|
| 2,039,344 | Putnam et al. | May 5, 1936 |
| 2,051,473 | Evans et al. | Aug. 18, 1936 |
| 2,206,924 | Stevens et al. | July 9, 1940 |

OTHER REFERENCES

Meyer et al., "Monatschefte fur chemie," 53/54 (1929), pages 721–752 (32 pages). Disclosure relied on is in pages 735–6 only.